United States Patent
Sakurai

(10) Patent No.: US 9,507,551 B2
(45) Date of Patent: Nov. 29, 2016

(54) CHANGING THE NAME OF A PRINT JOB WHEN A PRINT INSTRUCTION IS FOR A PASS-THROUGH MODE

(71) Applicant: FUJI XEROX CO., LTD., Tokyo (JP)

(72) Inventor: Kazuhiko Sakurai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/818,471

(22) Filed: Aug. 5, 2015

(65) Prior Publication Data

US 2016/0224294 A1 Aug. 4, 2016

(30) Foreign Application Priority Data

Feb. 4, 2015 (JP) ................. 2015-020620

(51) Int. Cl.
*G06F 3/12* (2006.01)
(52) U.S. Cl.
CPC ........... *G06F 3/1244* (2013.01); *G06F 3/1204* (2013.01); *G06F 3/126* (2013.01); *G06F 3/1248* (2013.01)
(58) Field of Classification Search
CPC .. G06F 3/1244; G06F 3/1204; G06F 3/1248; G06F 3/126

USPC ......................................................... 358/1.15
See application file for complete search history.

(56) References Cited

U.S. PATENT DOCUMENTS

| | | | |
|---|---|---|---|
| 8,339,644 B2 | 12/2012 | Tanaka | |
| 2004/0021903 A1* | 2/2004 | Wanda | H04N 1/32529 358/1.15 |
| 2007/0146767 A1* | 6/2007 | Sakura | G06F 3/1206 358/1.14 |
| 2007/0279691 A1* | 12/2007 | Kimura | G06F 17/243 358/1.18 |
| 2012/0092717 A1* | 4/2012 | Saitoh | G06F 3/1203 358/1.15 |

FOREIGN PATENT DOCUMENTS

JP 2009-258987 A 11/2009

\* cited by examiner

*Primary Examiner* — Eric A Rust
(74) *Attorney, Agent, or Firm* — Sughrue Mion, PLLC

(57) ABSTRACT

An information processing apparatus includes a unit that, upon receiving from an application a print instruction for outputting document data to an image forming apparatus for printing without performing a process on the document data, obtains a print job name relating to the document data and changes the print job name in accordance with a predetermined rule.

8 Claims, 5 Drawing Sheets

FIG. 3

| Printer12345 | | | | | | |
|---|---|---|---|---|---|---|
| Printer (P) | Document (D) | View (V) | | | | |
| | Document Name | Status | Owner | Number of Pages | Size | Reception Time | Port |
| | aaa_pdf pass-through | | 001 | 5 | 1.3 MB | 15:57:15  01/01/2015 | ... |
| | bbb | | 002 | 1 | 638 KB | 16:01:10  01/01/2015 | ... |

110a

CHANGING THE NAME OF A PRINT JOB WHEN A PRINT INSTRUCTION IS FOR A PASS-THROUGH MODE

CROSS-REFERENCE TO RELATED APPLICATIONS

This application is based on and claims priority under 35 USC 119 from Japanese Patent Application No. 2015-020620 filed Feb. 4, 2015.

BACKGROUND

Technical Field

The present invention relates to an information processing apparatus, a document management system, and an information processing method.

SUMMARY

According to an aspect of the invention, there is provided an information processing apparatus including a unit that, upon receiving from an application a print instruction for outputting document data to an image forming apparatus for printing without performing a process on the document data, obtains a print job name relating to the document data and changes the print job name in accordance with a predetermined rule.

BRIEF DESCRIPTION OF THE DRAWINGS

Exemplary embodiments of the present invention will be described in detail based on the following figures, wherein:

FIG. 3 is a diagram for describing display operations for a print job;

DETAILED DESCRIPTION

Exemplary Embodiment

Configuration of Document Management System

Figure 1:
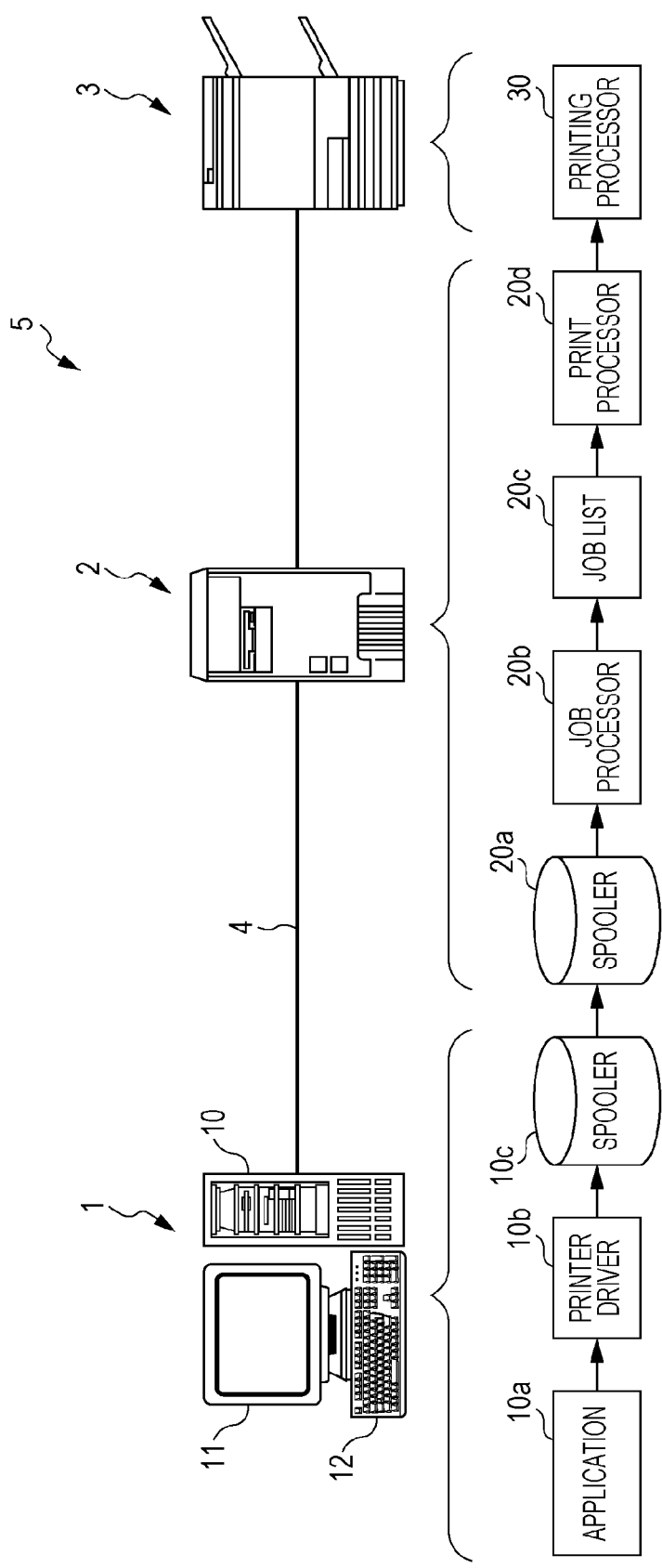
FIG. 1 is a schematic diagram illustrating an example of a configuration of a document management system according to an exemplary embodiment.

FIG. 1 is a schematic diagram illustrating an example of a configuration of a document management system according to an exemplary embodiment.

A document management system 5 includes a terminal 1, a digital frontend (printer controller) 2, and an image forming apparatus 3 that are connected to each other via a local area network (LAN) 4 so as to enable communication with each other.

The terminal 1 is an information processing apparatus, such as a personal computer (PC), and includes a system unit 10 that is composed of electronic components, such as a central processing unit (CPU) having a function for information processing, a flash memory, and a hard disk drive (HDD), a display 11 that displays text and images, and an operation unit 12 that outputs an operation signal to the system unit 10 in accordance with a performed operation.

The terminal 1 runs an operating system (OS) on the CPU and also runs an application (document creating application) 10a and a printer driver 10b on the OS. Document data generated by the application 10a is processed by the printer driver 10b. It is assumed that a series of print process steps performed on document data for printing is managed by the OS as a print job, and a print job name for identifying the print job is determined in accordance with the specification of the application 10a.

The printer driver 10b supports a mode (hereinafter referred to as a pass-through print mode) in which document data output from the application 10a is transmitted to the image forming apparatus 3 as is for printing in a case where the image forming apparatus 3 is able to perform a raster image processor (RIP) process on document data in a specific format, such as a portable document format (PDF), and if the application 10a is able to output the document data in a specific format together with a print instruction, for example. The printer driver 10b sets a print job name for the document data in accordance with a predetermined rule.

The printer driver 10b may perform a print process by using a graphics device interface (GDI), which is a function of the OS.

The terminal 1 includes a spooler 10c that is provided in a storage area on the HDD or the flash memory. Print data (or document data in a case of the pass-through print mode) output from the printer driver 10b is stored in the spooler 10c together with print setting information that indicates settings used in printing or the like as a print job. The print job stored in the spooler 10c is output to the digital frontend 2 basically on a first-in/first-out basis.

The digital frontend 2 is a server apparatus that processes a print job. The digital frontend 2 operates in response to a request from the terminal 1 and controls operations of the image forming apparatus 3. The digital frontend 2 includes a system unit that is composed of electronic components, such as a CPU having a function for information processing and a flash memory.

The digital frontend 2 includes a spooler 20a and a job list 20c that are provided in a storage area of the flash memory. A print job received from the spooler 10c of the terminal 1 is stored in the spooler 20a, and the status of the print job is written to the job list 20c.

The digital frontend 2 makes the CPU function as a job processor 20b and a print processor 20d by executing a software program. In a case where a print job that the job processor 20b receives from the spooler 20a is processed in the pass-through print mode, the job processor 20b changes the print job name of the print job, attaches (associates) an icon indicating the pass-through print mode to (with) the job list 20c, for example, and registers the print job in the job list 20c. The print processor 20d sequentially outputs jobs registered in the job list 20c to the image forming apparatus 3.

The image forming apparatus 3 includes at least a printing processor 30 having a print function, and performs a print process, such as a RIP process, in accordance with information received from the digital frontend 2.

Operations of Document Management System

Next, operations according to this exemplary embodiment, namely, (1) operations of the printer driver 10b, (2) operations of the digital frontend 2, and (3) display operations for a print job, are described.

(1) Operations of Printer Driver

Figure 2:
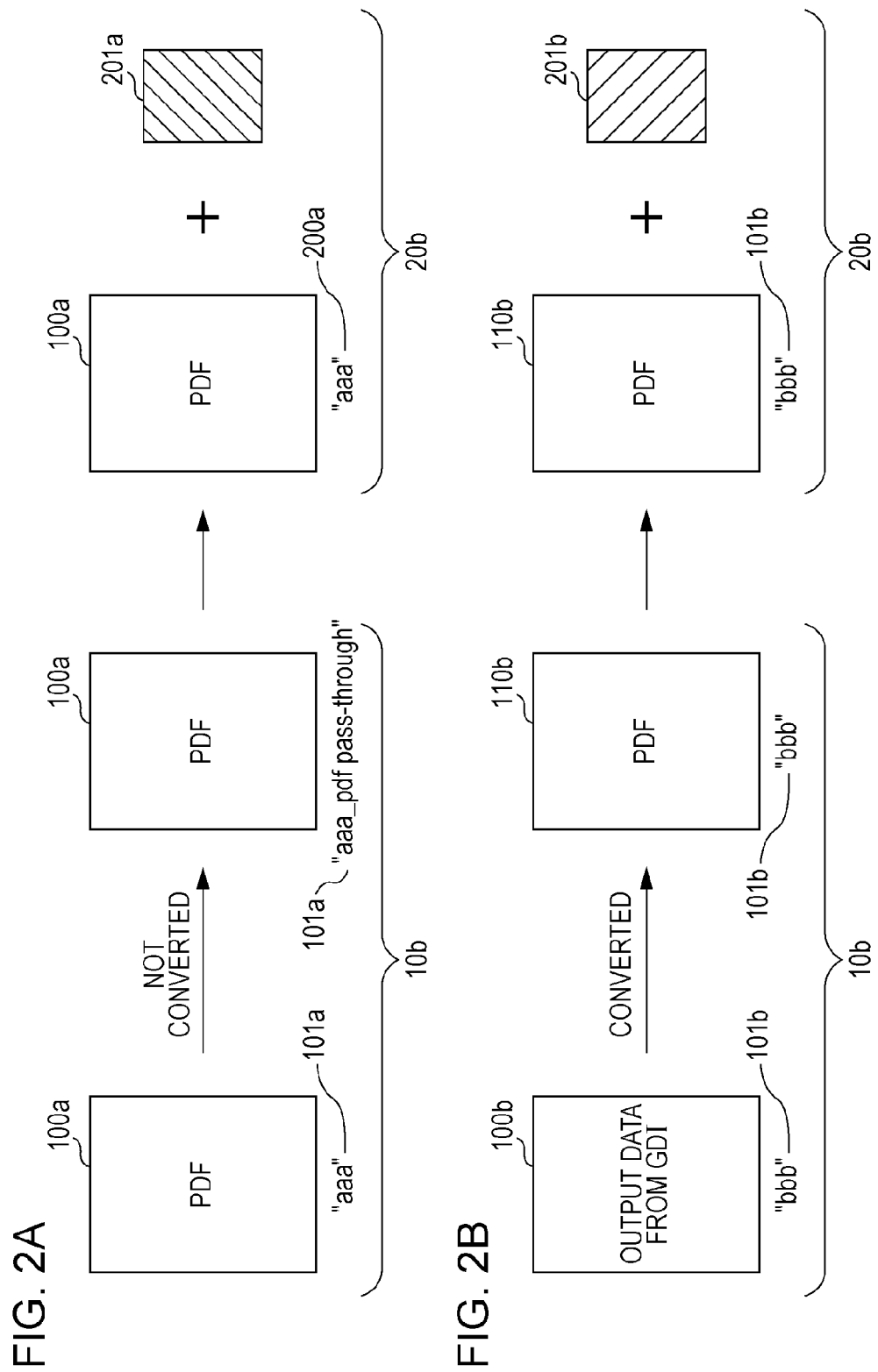
FIGS. 2A and 2B are schematic diagrams for describing operations performed in order to process document data.
Figure 4:
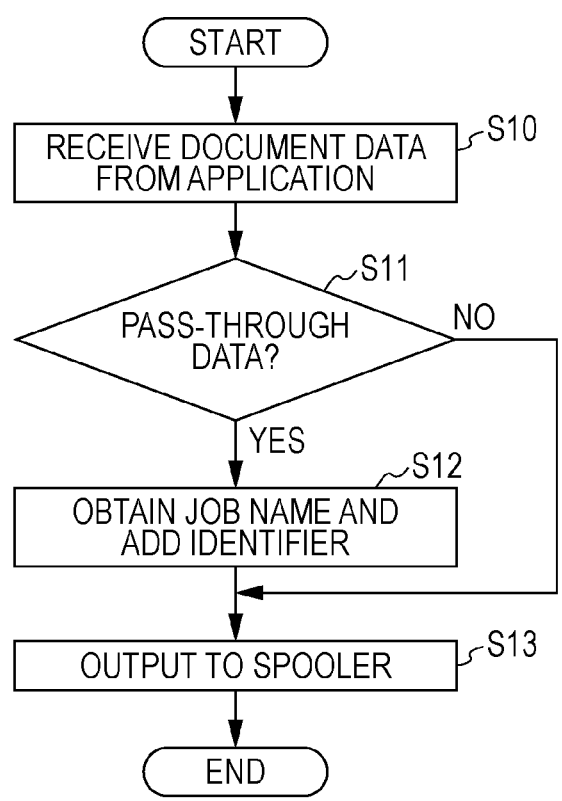
FIG. 4 is a flowchart illustrating an example of operations of a printer driver.

FIGS. 2A and 2B are schematic diagrams for describing operations performed in order to process document data. FIG. 4 is a flowchart illustrating an example of operations of the printer driver 10b.

First, a user of the terminal 1 uses the application 10a of the terminal 1 by operating the operation unit 12 and creates document data. Next, the user provides an instruction for processing the document data for printing by operating the operation unit 12.

The terminal 1 runs the application 10a on the CPU upon receiving the instruction provided in the above-described operation, generates document data, and passes the document data to the printer driver 10b together with a print instruction in a case where the application 10a supports the pass-through print mode. In a case where the application 10a does not support the pass-through print mode, the printer driver 10b generates print data from the document data by using the GDI.

A process performed by the printer driver 10b is specifically described below with reference to FIG. 4.

First, the printer driver 10b receives document data from the application 10a (step S10), and checks a print instruction provided by the application 10a and the format of the document data generated by the application 10a (step S11).

(1-1) In the Pass-Through Print Mode

If the print instruction and the format of the document data support the pass-through print mode (correspond to PDF, for example) (Yes in step S11), the printer driver 10b obtains a print job name 101a "aaa" relating to the document data (document data 100a) that is pass-through data and that supports the pass-through print mode from the OS, adds an identifier "pdf pass-through" to the print job name 101a in accordance with a predetermined rule, for example, to thereby change the print job name 101a to "aaa_pdf pass-through" (step S12), as illustrated in FIG. 2A. Note that the date may be added as the identifier, or the user name, the name of the terminal 1, or the like may be added as the identifier.

(1-2) Not in the Pass-Through Print Mode

If the print instruction and the format of the document data do not support the pass-through print mode (are output from the GDI, for example) (No in step S11), the printer driver 10b converts the document data (output data 100b) output from the GDI into document data 110b that is in a format (PDF, for example) supported by the image forming apparatus 3, and keeps the print job name relating to the document data unchanged, as illustrated in FIG. 2B.

Next, the printer driver 10b outputs the document data 100a for which the job name has been changed in step S12, and the document data 110b for which the job name has not been changed, to the spooler 10c provided in the storage area on the system unit 10 of the terminal 1 together with print setting information that indicates settings used in printing or the like as print jobs (step S13).

The print jobs stored in the spooler 10c are output to the digital frontend 2 basically on a first-in/first-out basis.

(2) Operations of Digital Frontend

Figure 5:
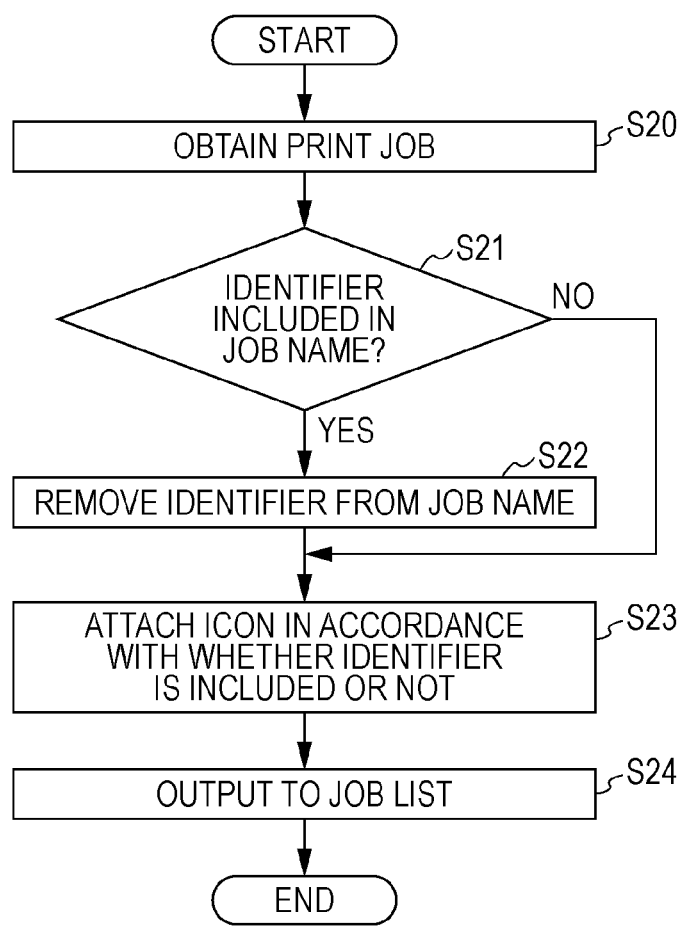
FIG. 5 is a flowchart illustrating an example of operations of a digital frontend.

FIG. 5 is a flowchart illustrating an example of operations of the digital frontend 2.

The digital frontend 2 stores, in the spooler 20a, a print job received from the spooler 10c of the terminal 1 via the LAN 4.

Next, the job processor 20b of the digital frontend 2 obtains the print job from the spooler 20a (step S20), and checks the print job name of the print job (step S21).

(2-1) Case where the Identifier Indicating the Pass-Through Print Mode is Included If the identifier "pdf pass-through" added in step S12 described above is included in the print job name (print job name 101a "aaa_pdf path-through" relating to the document data 100a) (Yes in step S21), the job processor 20b removes the identifier "pdf pass-through" from the print job name 101a, thereby changing the print job name to a print job name 200a "aaa" (step S22), and attaches (associates) an icon 201a indicating that the pass-through print mode is supported to (with) the job list 20c (step S23), as illustrated in FIG. 2A.

Note that the icon 201a may be in a specific color in order to indicate that the pass-through print mode is supported, and may be of a design that varies depending on the status of the print job. Alternatively, the icon 201a may be of a specific design in order to indicate that the pass-through print mode is supported, and may be in a color that varies depending on the status of the print job.

(2-2) Case where the Identifier Indicating the Pass-Through Print Mode is not Included If the identifier "pdf pass-through" is not included in the print job name (print job name 101b "bbb" relating to the document data 110b) (No in step S21), the job processor 20b attaches (associates) an icon 201b which indicates that the pass-through print mode is not supported and which is used in the related art to (with) the job list 20c, without changing the print job name 101b (step S23), as illustrated in FIG. 2B. Note that in a case where the printer driver 10b does not support the pass-through print mode as in the related art, the print job name 101b does not include the identifier "pdf pass-through" as a matter of course, and therefore, the icon 201b that corresponds to the print job name 101b is an icon indicating that the pass-through print mode is not supported. In other words, the icon 201b indicating that the pass-through print mode is not supported is an icon that corresponds to the print job name 101b in the related art.

Next, the job processor 20b outputs and writes the print job name, the icon, information about the process state, and the like of the print job to the job list 20c (step S24).

Next, the print processor 20d sequentially outputs print jobs in the job list 20c to the image forming apparatus 3.

Next, the image forming apparatus 3 performs a print process, such as a RIP process, in accordance with information received from the digital frontend 2.

(3) Display Operations for Print Job

FIG. 3 is a diagram for describing display operations for a print job.

When a user makes a request for displaying the content of a print job stored in the spooler 10c by operating the operation unit 12 of the terminal 1, the OS that runs on the terminal 1 accesses the spooler 10c and displays the status of the print job on the display 11 as a print job display 110a.

In the print job display 110a, items are displayed, such as a document name that indicates a print job name, a status that indicates the process state of the print job, an owner that indicates a user who has provided an instruction for printing, the number of pages that indicates the number of pages of a document that corresponds to the document data, a size that indicates the data size of the print job, and a reception time that indicates the time when the instruction for printing was received.

As the document name in the print job display 110a, the print job name 101a "aaa_pdf path-through" which indicates that the pass-through print mode is supported, the print job name 101*b* "bbb" which indicates that the pass-through print mode is not supported and which is used in the related art, and the like are displayed.

The user of the terminal 1 is able to check whether document data is processed in the pass-through print mode by referring to the document name in the print job display 110*a*. Specifically, in a case where a result of printing is unsatisfactory to the user, the user is able to check whether or not the unsatisfactory printing was caused by the printing method by referring to the document name in the print job display 110*a*, in a situation described below, for example. In a case where a print process is performed by using a method other than a method that supports the pass-through print mode, document data in a PDF format is converted into document data in the format of GDI output data and is thereafter restored to document data in a PDF format. Consequently, a conversion process is repeatedly performed on a color space that is expressed in the original PDF format. As a result, the color tone of the document data is not correctly printed or a transparent mode is not expressed due to a mismatch between the color spaces or the like.

The user is able to check whether the application 10*a*, the printer driver 10*b*, the digital frontend 2, and the image forming apparatus 3 support the pass-through print mode.

When the user makes a request for displaying the status of a print job that is being processed by the digital frontend 2 and the image forming apparatus 3, by operating the operation unit 12, the OS that runs on the terminal 1 may access the job list 20*c* of the digital frontend 2 and display the status of the print job on the display 11. In this case, the identifier has been removed from the print job name, and therefore, the user is unable to determine, on the basis of the print job name, whether the pass-through print mode is used. However, the icon indicating that the pass-through print mode is supported is attached, and therefore, the user is able to determine, on the basis of the type of icon, whether the print job is processed in the pass-through print mode.

Other Exemplary Embodiments

Note that exemplary embodiments of the present invention are not limited to the above-described exemplary embodiment, and various modifications may be made without departing from the spirit of the present invention. For example, although a method of adding an identifier to a print job name is described in the above-described exemplary embodiment, the original print job name need not be kept as long as the user is able to determine that the pass-through print mode is used, or the original print job name may be changed in accordance with a predetermined rule.

Any item other than the print job name included in the print job display 110*a* may be used to check whether the pass-through print mode is used. In this case, an identifier may be added to the status, the owner, the number of pages, or the like, or the content of any item may be changed.

The job processor 20*b* may be configured not to remove the identifier from a print job name.

In the above-described exemplary embodiment, although the functions of the printer driver 10*b* and the job processor 20*b* of the digital frontend 2 are implemented by a software program, all or some of the units may be implemented by hardware, such as an application-specific integrated circuit (ASIC). The program used in the above-described exemplary embodiment may be stored on a recording medium, such as a compact disc read-only memory (CD-ROM) and provided therefrom. Rearrangement of, deletion from, addition to, or the like of the steps described in the above-described exemplary embodiment may be possible without changing the spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to execute:
   a unit configured to:
   receive, from an application, a print instruction for outputting document data to an image forming apparatus;
   obtain a print job name relating to the document data;
   determine whether the print instruction is for a pass-through printing mode, in which, the document is output for printing without performing the process on the document data, the pass through printing mode is determined based on a format of the document data; and
   change the print job name in response to a determination the print instruction is for the pass-through printing mode, in accordance with a predetermined rule.

2. The information processing apparatus according to claim 1, wherein the nit is further configured to maintain the print job name in response to a determination that the print instruction is for a non-pass-through printing mode, in which, the document is output for printing after performing the process on the document data.

3. A document management system comprising:
   an information processing apparatus configured to:
   receive, from an application, a print instruction for outputting document data to an image forming apparatus;
   obtain a print job name relating to the document data;
   determine whether the print instruction is for a pass-through printing mode, in which, the document is output for printing without performing a process on the document data, the pass through printing mode is determined based on a format of the document data; and
   change the print job name in response to a determination the print instruction is for the pass-through printing mode, in accordance with a predetermined rule; and
   a print job processing server configured to:
   receive a print job from the information processing apparatus; and,
   add in a case where a print job name of the print job has been changed in accordance with the predetermined rule, to the print job, information indicating that the document data has been output to the image forming apparatus without having been subjected to a process.

4. The document management system according to claim 3, wherein
in a case where the print job name of the received print job has been changed in accordance with the predetermined rule, the print job processing server is further configured to revert the print job name to a print job name before changing.

5. The document management system according to claim 3, wherein
the print job processing server includes a display that displays the information indicating that the document data has been output to the image forming apparatus without having been subjected to a process, in association with the print job name.

6. The document management system according to claim 3, wherein the information processing apparatus is further configured to maintain the print job name in response to a determination that the print instruction is for a non-pass-through printing mode, in which, the document is output for printing after performing the process on the document data.

7. An information processing method comprising:
receiving from an application a print instruction for outputting document data to an image forming apparatus;
obtaining a print job name relating to the document data;
determining whether the print instruction is for a pass-through printing mode, in which, the document is output for printing without performing a process on the document data, the pass through printing mode is determined based on a format of the document data; and
changing the print job name in response to a determination the print instruction is for the pass-through printing mode, in accordance with a predetermined rule.

8. The information processing method according to claim 7, further comprising:
maintaining the print job name in response to a determination that the print instruction is for a non-pass-through printing mode, in which, the document is output for printing after performing the process on the document data.

* * * * *